(12) United States Patent
Barter (10) Patent No.: US 12,505,769 B2
(45) Date of Patent: Dec. 23, 2025

(54) ADAPTIVE LASER CONTROLLER FOR LASER DRIVEN DISPLAYS

(71) Applicant: Microsoft Technology Licensing, LLC, Redmond, WA (US)

(72) Inventor: Thomas H. Barter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,505

(22) Filed: May 31, 2024

(65) Prior Publication Data
US 2025/0372013 A1   Dec. 4, 2025

(51) Int. Cl.
*G09G 3/02* (2006.01)

(52) U.S. Cl.
CPC ....... *G09G 3/02* (2013.01); *G09G 2320/0693* (2013.01); *G09G 2330/12* (2013.01); *G09G 2360/145* (2013.01)

(58) Field of Classification Search
CPC ............. G09G 3/02; G09G 2320/0693; G09G 2330/12; G09G 2360/145
See application file for complete search history.

(56) References Cited

U.S. PATENT DOCUMENTS

| | | | |
|---|---|---|---|
| 10,453,370 B1 | 10/2019 | Hayakawa | |
| 2009/0160833 A1* | 6/2009 | Brown | G09G 3/02 345/207 |
| 2011/0181791 A1* | 7/2011 | Huang | H04N 9/3158 348/E9.026 |
| 2013/0293591 A1 | 11/2013 | Miller | |
| 2018/0352164 A1 | 12/2018 | Higuchi | |

OTHER PUBLICATIONS

Extended European search report received in European Application No. 25179156.2, mailed on Aug. 29, 2025, 16 pages.

* cited by examiner

*Primary Examiner* — Chanh D Nguyen
*Assistant Examiner* — Gloryvid Figueroa-Gibson
(74) *Attorney, Agent, or Firm* — Schwegman Lundberg & Woessner, P.A.

(57) ABSTRACT

Systems, devices, methods, and computer-readable media for driving a laser of a laser-driven display. A method includes determining a first error between a first expected light intensity and a first actual light intensity from the laser at a specified control light intensity and specified control pulse spacing, determining a second error between a second expected light intensity and a second actual light intensity from the laser at a specified second light intensity and specified second pulse spacing, updating, by the secondary control system and based on the second error, a laser model resulting in an updated laser model, the laser model indicating respective driving currents to generate respective light intensities by the laser, and driving, by a driver and at a driving current determined based on the first error and the updated laser model, the laser to generate a pixel of the laser-driven display.

20 Claims, 9 Drawing Sheets

FIG. 5 — $t_{grid}$ = 5 ns, $I_{offset}$ = 0

FIG. 6 — $t_{grid}$ = 7 ns, $I_{offset}$ = 0.2

FIG. 7 — $t_{grid}$ = 10 ns, $I_{offset}$ = 0.5

FIG. 8 — $t_{grid}$ = 20 ns, $I_{offset}$ = 0.2

SPACING GRIDPOINTS OF INTERNAL L>I MODEL, FIXED SPACING OFFSET

ADAPTIVE LASER CONTROLLER FOR LASER DRIVEN DISPLAYS

TECHNICAL FIELD

Devices, systems, methods, and computer-readable mediums for controlling laser driven displays with multiple condition control for accurate prediction of light intensity per current driven.

BACKGROUND

Laser beam scanning is a compelling display technology for augmented reality headsets, among other display technologies. Laser beam scanning can provide a high brightness, and wide field-of-field display in a compact package. In such a display, a laser is repeatedly pulsed on-and-off as one or more mirrors scan through an angle over time. In a given scan of a display, each pulse is thus projected at a distinct angle, forming pixels of an output display image.

Grayscale and color control of these pixels come from control of the optical power produced during the pulsing of the laser. Thus, the color, contrast and grayscale fidelity of a laser-beam-scanning display come in part from the accurate control of output pulse light levels.

Semiconductor laser devices driven by a pulsed current source are typically used in such a system. The optical-electrical response of a semiconductor laser is inherently non-linear, at least because of the laser threshold. Optical emission from the laser is low below the threshold current, and high above the threshold current.

To faithfully display a source image or video, a control system must predict the required current for a given requested light level, so that the control system, driver, and laser work together to give a linear response. Accurate prediction of the laser current-to-light curve is required, even as this curve (particularly the laser threshold) may change due to parameters such as temperature, unit-to-unit variability, aging and even the time between laser pulses.

SUMMARY

Improved laser control systems include primary and secondary control systems that operate to calibrate an intensity to current (L→I) curve of a laser. The primary and secondary control systems provide more accurate determinations of a driving current (I) than prior systems that operate with just the primary control system. The primary control system only calibrated for a single control configuration (combination of drive current and pulse spacing). The combination of the primary and secondary control systems calibrate for multiple drive currents, pulse spacings, or a combination thereof.

A method for control of a laser in a laser-driven display can include determining, by a primary control system of a laser-driven display, a first error between a first expected light intensity and a first actual light intensity from the laser at a specified control light intensity and specified control pulse spacing. The method can further include determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof. The method can further include updating, by the secondary control system and based on the second error, a laser model resulting in an updated laser model, the laser model indicating respective driving currents to generate respective light intensities by the laser. The method can further include driving, by a driver and at a driving current determined based on the first error and the updated laser model, the laser to generate a pixel of the laser-driven display.

The primary control system can be constrained to determining the first error at a single driving condition including the specified control light intensity and the specified control pulse spacing. Operation of the secondary control system can be time multiplexed with the operation of the primary control system.

The primary control system can include a proportional, integral, derivative (PID) controller that determines the first error. The secondary control system can include a steepest descent controller that determines the second error. The second error can include parameterized modifications to a plurality of driving conditions at a specified driving current. The method can further include adding, by an addition operator, the first error to a driving current corresponding to a light intensity in the updated laser model, the light intensity corresponding to a pixel of an image provided on the laser-driven display.

The secondary control system can include a plurality of PID controllers dedicated to determining errors at respective driving conditions. The driving conditions can be different laser pulse spacings. The actual light intensity can be determined by a photodiode that receives a portion of light generated by the laser.

A laser-driven display control system can include a laser, a primary control system, a secondary control system, and a driver. The primary control system can be configured to provide a light intensity value as an index into a laser model to determine a driving current. The primary control system can be configured to determine a first error between a first expected light intensity and a first actual light intensity from the laser at a specified control light intensity and specified control pulse spacing. The secondary control system can be configured to determine a second error between a second expected light intensity and a second actual light intensity from the laser at a specified second light intensity and specified second pulse spacing. The specified second light intensity can be different from the specified control light intensity, or the specified second pulse spacing is different from the specified control pulse spacing, or a combination thereof. The secondary control system can be configured to update, based on the second error, the laser model resulting in an updated laser model. The driver can be configured to provide a driving current determined based on the first error, the light intensity value and the updated laser model, to the laser. The system can further include an addition operator configured to add the first error to a driving current corresponding to a light intensity in the updated laser model resulting in a sum, the light intensity corresponding to a pixel of an image provided on the laser-driven display and provide the sum to the driver. The system can further include a photodiode situated to receive a portion of the light from the laser and provide data indicating an intensity of the received light to the primary and secondary control systems.

A machine-readable medium can include instructions that, when executed by a machine, cause the machine to perform operations of the method or the system.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Laser control for laser beam scanning display systems includes a controller that provides laser intensity information from a primary measurement system. An improved system for laser control includes two additional components, a secondary measurement system and a multiple-input, multiple-output controller. The secondary measurement system iterates through optical measurement of a number of different laser drive conditions to generate a set of light errors. The multiple-input multiple-output controller takes these errors and modifies an internal laser model to minimize or reduce the magnitude of the error.

First an existing single drive condition closed loop feedback scheme and its problems are described. Then a description of how an expanded adaptive control scheme helps address the problems of the single drive condition closed loop feedback to provide more accurate laser control. The existing single drive condition close loop feedback scheme includes a model-based, parameterized light-to-current prediction, that is updated by an optical feedback scheme.

The model-based light-to-current prediction is a system for estimating each of the currents required to generate all the different display light levels required by the system. This will notionally look something like the inverse of the laser current-to-light curve but will be parameterized in some way to generate light-to-current curves as a function of different parameters. For example, the laser light-to-current curve could be implemented as a lookup table, with an additional offset current to roughly account for threshold shifts. This could also be implemented in many other ways, such as parameterized algebraic curves like splines. It is expected that some of this data will be generated in a calibration process for each laser system.

The single drive condition optical feedback relies on the drive and measurement of a special set of laser pulses specifically for the purposes of feedback control. Typically a train of identical pulses (and this single drive condition) is driven in a manner that does not disturb the display of video. The intensity of this pulse train is measured using a photodiode, and the measurement result is returned to a control system. Comparison between the intended intensity of the pulse, and the actual measured intensity allows the generation of a primary error, which can be fed to a control system.

By driving a low light level pulse (e.g., current within about 1% of a lasing threshold), this error becomes highly sensitive to differences between a model threshold, and that of the actual laser device. Such differences can result from calibration details, or changes in the threshold over temperature, device ware, or the like. A feedback controller, such a proportional-integral-derivative (PID) controller, takes this error, and modifies a single variable in a model-based current-to-light (IL) prediction. It is likely that updating this parameterization primarily changes the lasing threshold, and thus the controller can minimize the error at the drive condition by making the internal lading threshold prediction close to that of the actual device.

Although the model may take other parameterizations, only a single one is used in this primary control loop, and this control loop only minimizes error at a single drive condition: the light level used in the drive pulse, and the specific time between drive pulses. The model will predict currents at other values of light levels and pulse timings, but it is strongly relying on the model accuracy which is not guaranteed by feedback. The model may be inaccurate due to inaccuracies in calibration or a change in the device behavior over its lifetime. Display of video may require driving at all of these conditions not guaranteed by feedback, and such the model errors will propagate into poor image quality.

A solution to the previous mentioned issues with single drive parameter closed loop feedback can include two parts: a second optical feedback system that iterates through measurements of a list of different drive conditions, and a multiple-input-multiple-output controller that uses these measurements to update the model-based IL prediction.

The secondary measurement system includes a methodology to drive a train of identical pulses through the laser and measure the optical intensity of these pulses. This is superficially similar in function with the primary system and coexists with the primary system. The secondary system may use a second photodiode, or it may work in a time multiplexed manner with a photodiode of the first system. The key difference is that this secondary system iterates through the list of different drive conditions relevant to the display. This list includes one or more of:

Different light levels, spanning the light levels required to display 8-bit gamma encoded video.

The timing between pulses, covering the span of timing required for video display with a scanning mirror.

Different disturbance conditions, such as the presence of electrical cross talk from a second laser drive.

While the rate of the secondary measurement system may be similar to the primary system, because of the iteration, the rate of measurement in any given drive condition is slower because there are multiple drive conditions being measured by the secondary system. As with the primary system, a comparison between the intended drive levels and the actual measurement generates an error.

Figure 1:
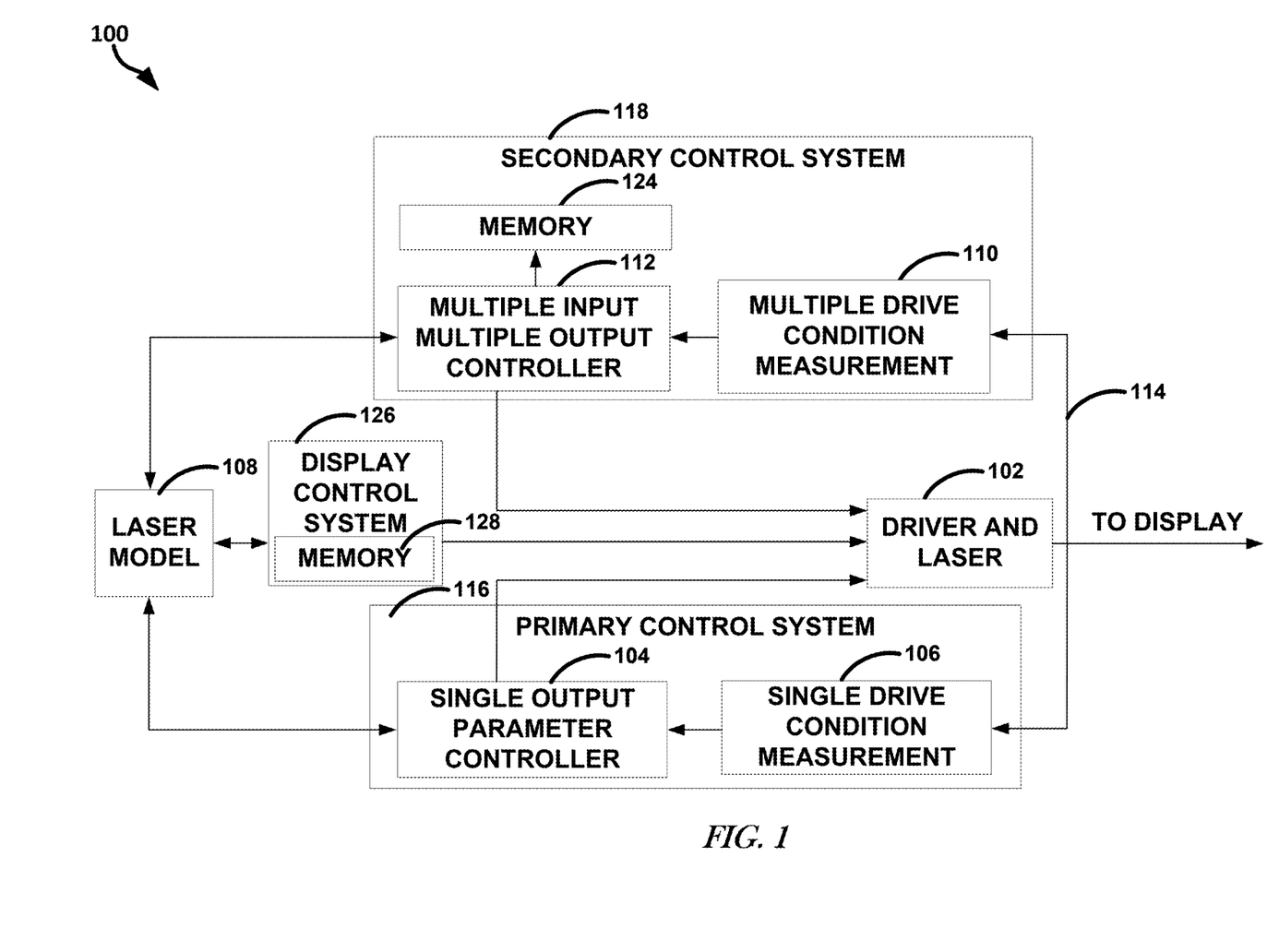
FIG. 1 illustrates, by way of example, a diagram of an embodiment of an improved laser control system for populating a display.

FIG. 1 illustrates, by way of example, a diagram of an embodiment of an improved laser control system 100 for populating a display. The laser control system 100 as illustrated includes a driver and laser 102 with multiple control systems including a primary control system 116 and a secondary control system 118. The primary control system 116 is responsible for providing a driving current to the laser 102 and updating a primary driving condition of a laser model 108. The primary control system 116 includes single drive condition measurement circuitry 106 and a single output parameter controller 104.

The single drive condition measurement circuitry 106 determines an intensity of the light 114 generated by the laser 102. The intensity measured by the circuitry 106 over time is from providing a consistent driving current to the laser 102. The single drive condition measurement circuitry 106 thus generates intensity data. The intensity data is provided to the controller 104.

The controller 104 can lookup, based on the laser model 108, an expected intensity at the driving current corresponding to the intensity measured by the circuitry 106. The controller 104 can otherwise know a goal intensity. The controller 104 can include a PID (proportional-integral-derivative) or other type of intensity adjusting mechanism that determines, based on the intensity from the circuitry 106 and the goal intensity, an error. The error can be applied, by the controller 104, to the laser model 108. Applying the error changes an IL curve (e.g., defined by a lookup table of data points) that is defined within the laser model 108. Applying the error thus changes an amount of current is applied to generate a given light intensity in a future laser pulse.

The secondary control system 118 is similar to the primary control system 116, with the secondary control system 118 measuring the response of the laser 102 to different driving conditions than the one driving condition measured by the primary control system 116. The different driving conditions are measured by multiple drive condition measurement circuitry 110. The secondary control system 118 does not drive a part of the display that shows the image to the user. Instead, the secondary control system 118 can drive light 114 to a portion of the display that is not viewable by the user.

The different driving conditions can include different driving currents (corresponding to different light levels), different timing between pulses, different disturbance conditions, a combination thereof, or the like. "Different" in this context means different than the primary driving condition measured by the primary control system 116. The different driving currents can correspond to a complete range of the light levels that can be provided on the display. The different timing of the pulses can span a complete range required to provide an image on the display using a scanning mirror. Note that, when using a scanning mirror, timing between pulses is not consistent across the display. If the image includes "pixels" (a laser pulse on a specific location on the display is called a "pixel" herein) that are to be uniformly spaced and the scanning mirror has a uniform rotation rate, the time between pulses is going to be inconsistent. Inconsistent time between pulses can cause the light 114 generated by the laser 102 to be inconsistent, even with a same driving current. Different disturbance conditions include the presence of electrical cross talk, among other noisy environment conditions.

The laser model 108 includes a plurality of IL curves that correspond to the plurality of drive conditions. The plurality of drive conditions span the environmental expectations and possible intensity requirements for generating the images on the display. IL curves are shown elsewhere herein.

The primary control system 116 and the secondary control system 118 can be implemented using electric or electronic components. The electric or electronic components can include one or more resistors, transistors, inductors, capacitors, diodes (e.g., photodiodes, regular diodes, Zener diodes, or other diodes), amplifiers, logic gates (e.g., AND, OR, XOR, negate, or the like), multiplexers, power supplies, analog to digital converters, digital to analog converters, switches, or the like, configured to perform operations of the control system 116, 118.

In performing measurements, by the secondary control system 118, the secondary control system 118 can be time multiplexed with the primary control system 116 measurements. The primary control system 116 can drive the laser 102 to form the image on the display and can make measurements of intensity as it generates the image or at some time between pulses used to generate the image. The primary control system 116 can get priority to operate the laser 102 at the primary drive condition and the secondary control system 118 can then operate the laser 102 at the secondary drive condition at a time at which the primary control system 116 is not driving the laser 102 to generate an image or to make a curve adjusting measurement.

A multiple-input multiple-output (MIMO) controller 112 can update the laser model 108 (e.g., a model-based light-to-current curve) in such a way that minimizes or reduces the error in each measurement condition. The update is to one or more data points that represent the curve in the lookup table that represents the laser model. More details regarding how a curve is represented by a table is provided in later FIGS. The MIMO controller 112 can store a history of errors from each measurement condition in a memory 124 that is onboard or external to the MIMO controller 112. The history of errors can include one or more of the most recent measurements, errors, a combination thereof, or the like. This MIMO controller 112 can exist onboard a head mounted device (HMD), or it could exist on a host computer (e.g., a personal computer (PC)) during a calibration process. The calibration process may or may not be run in real time.

A display control system 126 is responsible for providing the driver and laser 102 with control signals that provide the pixels on the display. The display control system 126 looks up, by the laser model 108, a driving current corresponding to a pixel to be generated on the display. A memory 128 can indicate intensities for each of the pixels of the display. That intensity can be used as an index into the laser model 108 to determine the driving current corresponding to the intensity.

Image pixels, in general, are produced by the system 100 every few nanoseconds (with a break once a frame which lasts on the order of tens of milliseconds). Thus it is impossible to measure and correct for each of these pixels. The primary system 116 and the secondary system 118 operate during times when pixels are not being generated by the display control system 126. The primary system 116 and the secondary system 118 try to ensure that when the image pixels are generated, they are accurate.

Figure 2:
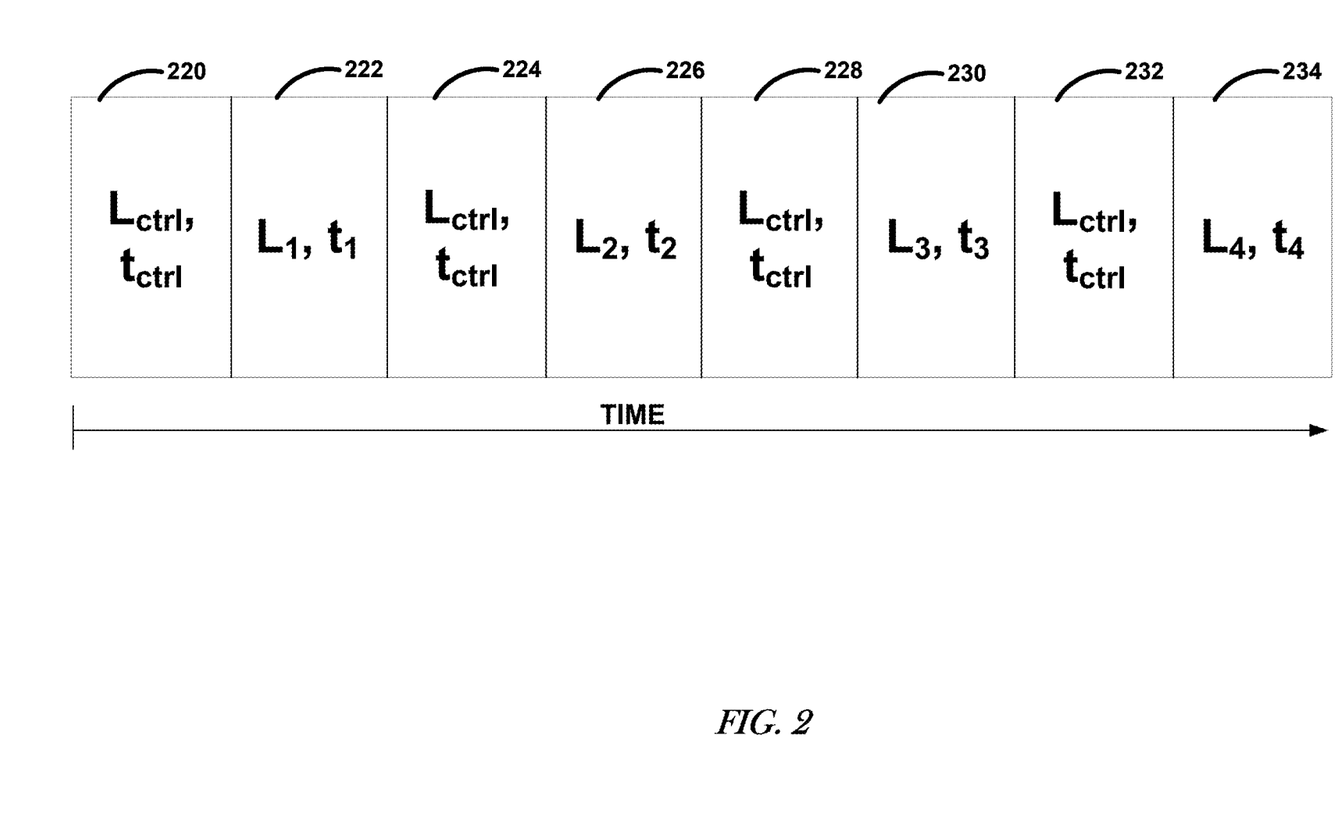
FIG. 2 illustrates, by way of example, a diagram of an embodiment of time multiplexing between the primary control system and the secondary control system.

FIG. 2 illustrates, by way of example, a diagram of an embodiment of time multiplexing between the primary control system 116 and the secondary control system 118. The subscript "ctrl" means that the primary control system 116 has control in that time frame and all other subscripts indicate that the secondary control system 118 has control. The different subscripts in the secondary control system 118 indicate that a different driving condition is tested during that time frame. Suppose that an existing photodiode system for single parameter control (e.g., a primary control system 116) runs at sample rate S. By reducing the sample rate of the primary control system 116 to S/2, this leaves every second measurement available for the secondary control system 118. FIG. 2 shows 4 measurement conditions, corresponding to time frames 222, 226, 230, 234 that are iterated through by the secondary control system 118. FIG. 2 also shows four iterations of measuring the same driving condition using the primary control system 116 as time frames 220, 224, 228, 232.

Figure 3:
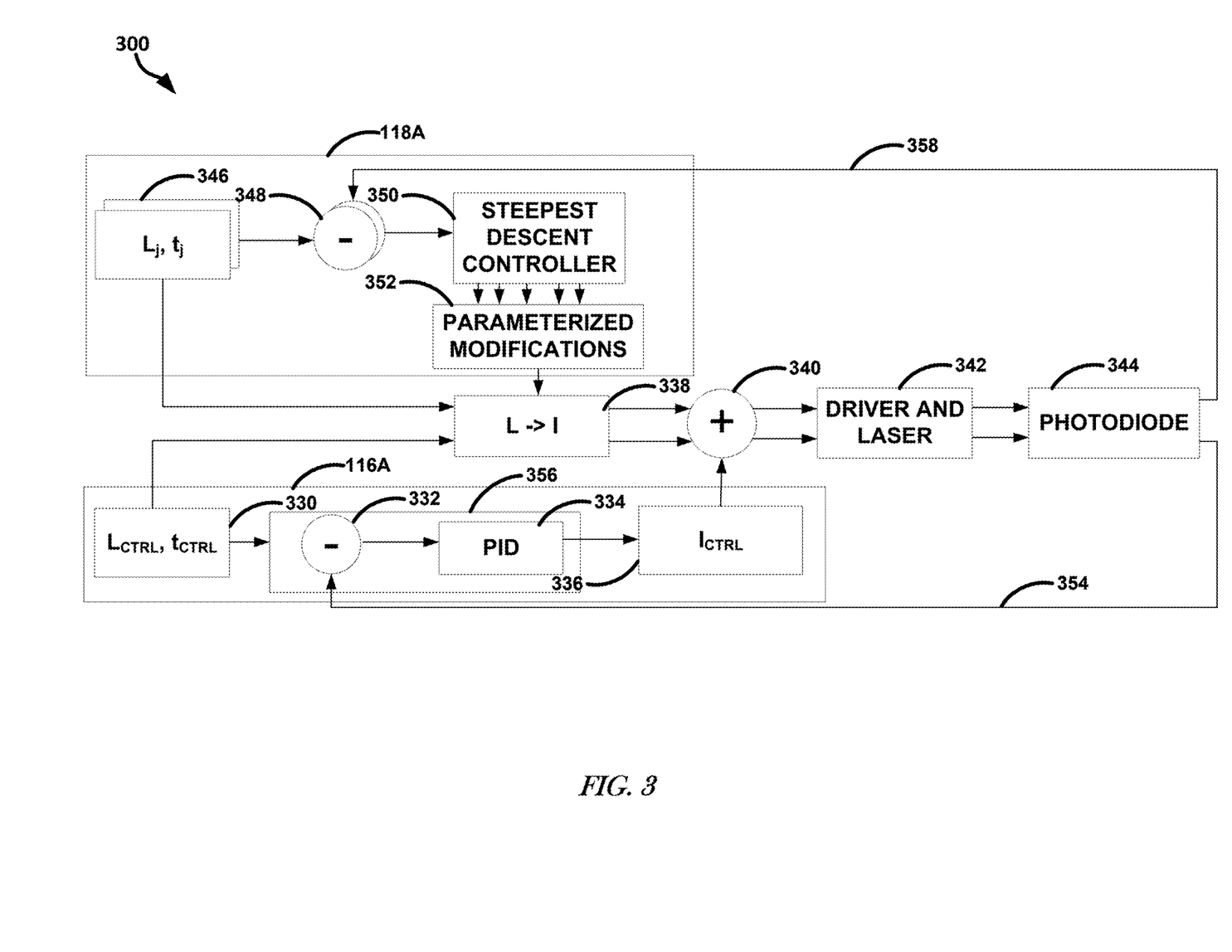
FIG. 3 illustrates, by way of example, a diagram of an embodiment of an improved laser control system for populating a display.

FIG. 3 illustrates, by way of example, a diagram of an embodiment of an improved laser control system 300 for populating a display. The control system 300 includes specific instances of the primary control loop 116A and the secondary control loop 118A. In general, a reference number without an alphabetical suffix refers to an item generally while a reference number with an alphabetical suffix refers to a specific instance of the general item. Thus, reference number 116 refers to the primary control loop in general and the reference number 116A refers to a specific instance of the primary control loop.

The primary control loop 116A of FIG. 3 includes light intensities ($L_{CTRL}$) for a control loop calibration and timing intensities ($t_{CTRL}$) for the control loop calibration. The pair ($L_{CTRL}$, $t_{CTRL}$) is referred to as a control loop calibration pair 330. The $L_{CTRL}$ indicates an intended intensity on the display. $t_{CTRL}$ indicates an intended timing for generating the intended intensity.

A subtraction operator 332 receives an actual light intensity 354 from a photodiode 344 and the $L_{CTRL}$. The subtraction operator 332 determines a difference between the actual light intensity 354 and the intended light intensity $L_{CTRL}$.

A PID controller 356 that includes the subtraction operator 332 and a PID operator 334, receives the intended intensity and the difference from the subtraction operator 332. The PID operator 334 determines a control current ($I_{CTRL}$) adjustment 336. The PID operator 334 is widely used in industrial control systems and a variety of other applications that include continuous modulated control. A PID controller calculates an error value as the difference between a desired setpoint (SP) (the intended light intensity) and a measured process variable (actual light intensity) and applies a correction based on proportional, integral, and derivative terms (denoted P, I, and D respectively). PID systems automatically apply accurate and responsive correction to a control function. The PID operator adjusts the current to achieve the intended light intensity with minimal delay and overshoot by providing a value indicating an amount to modulate the control current.

The secondary control loop 118A as illustrated includes a steepest descent controller 350 that generates parameterized modifications 352 based on an actual light intensity 358 and an intended light intensity ($L_j$). The intended light intensity can be generated at a specified time ($t_j$). The intended light intensity and the specified time pair are a secondary control system 118A control pair 346. The control pair 346 can be provided to respective difference operators 348 (sometimes called subtraction operators). The difference operators 348 can determine differences between the actual light intensity 358 and the intended light intensity.

The differences can be provided to the steepest descent controller 350 which determines parameterized modifications 352 to the laser model (illustrated as L→I 338 in FIG. 3). The steepest descent method of control, sometimes called gradient descent, is a method for unconstrained mathematical optimization. Gradient descent is a first-order iterative algorithm for finding a local minimum of a differentiable multivariate function. Using gradient descent, repeated steps are taken in an opposite direction of a gradient (or approximate gradient) of a function at a current point, because this is the direction of steepest descent.

The parameterized modifications indicate changes to one or more L→I curves based on the parameters. The secondary control system 118A iterates over a list of requested light intensities. Closed loop feedback of the primary control 116A system guarantees minimized error at a different light level (the light intensity corresponding to $L_{CTRL}$), but differences between the calibrated light-to-current curve and the actual laser behavior results in errors. In this example, the light-to-current (L→I) curve is parameterized as a lookup table. Modifications to this curve are parameterized by a smooth, multi-segment curve, where each measurement is associated with its own segment of the curve. By updating the parameters of each of these segments, a controller can minimize the error at each of the measurements. The controller 350 can be replaced with an array of PID controllers, or can be the steepest descent controller 350 as illustrated. The cost function of the steepest descent controller 350 with a cost function defined by all errors, or any number of more advanced features. This optimization could be run as part of a post-calibration correction, or continually over the life of the laser-driven display.

The laser model (the light-to-current curve 338) can be used to convert a light intensity to a current. The current can be added to the current modulation 336 determined by the primary control system 116A, by adder 340, resulting in a control current. The control current from the adder 340 can be provided to a driver. The driver generates the current and provides the current to the laser. The driver and laser 342 are illustrated as a single unit but can be separate, discreet components.

The laser generates light responsive to the current from the driver. A mirror redirects a portion of the laser light to a photodiode 344. Redirecting the portion of the laser light allows the light intensity to be sampled by a photodiode 344.

The photodiode 344 is a PN-junction (a semiconductor doped differently on contiguous portions thereof) that receives light and produces an electric current. Typical photodiode materials include silicon, germanium, and indium gallium arsenide. The current from the photodiode is thus indicative of the intensity of the laser light incident thereon. A digital value representing the light intensity is provided by the photodiode as either the actual intensity 354 or the actual intensity 358.

In sum, the primary control loop 116A makes measurements at light level $L_{CTRL}$, pulse timing $t_{CTRL}$. These measurements are used to update an offset current 336 via a PID controller 356.

In the secondary control loop 118A, multiple light level and timing pairs are iteratively measured, and the flow for one of these, $L_j$, $t_j$ is shown. The error is calculated for each measurement condition, and the results for all measurement conditions are input to a steepest descent controller 350. This controller 350 updates parameterized modifications 352 of the light-to-current curve 338 to minimize a cost function created from the array of errors.

Figure 4:
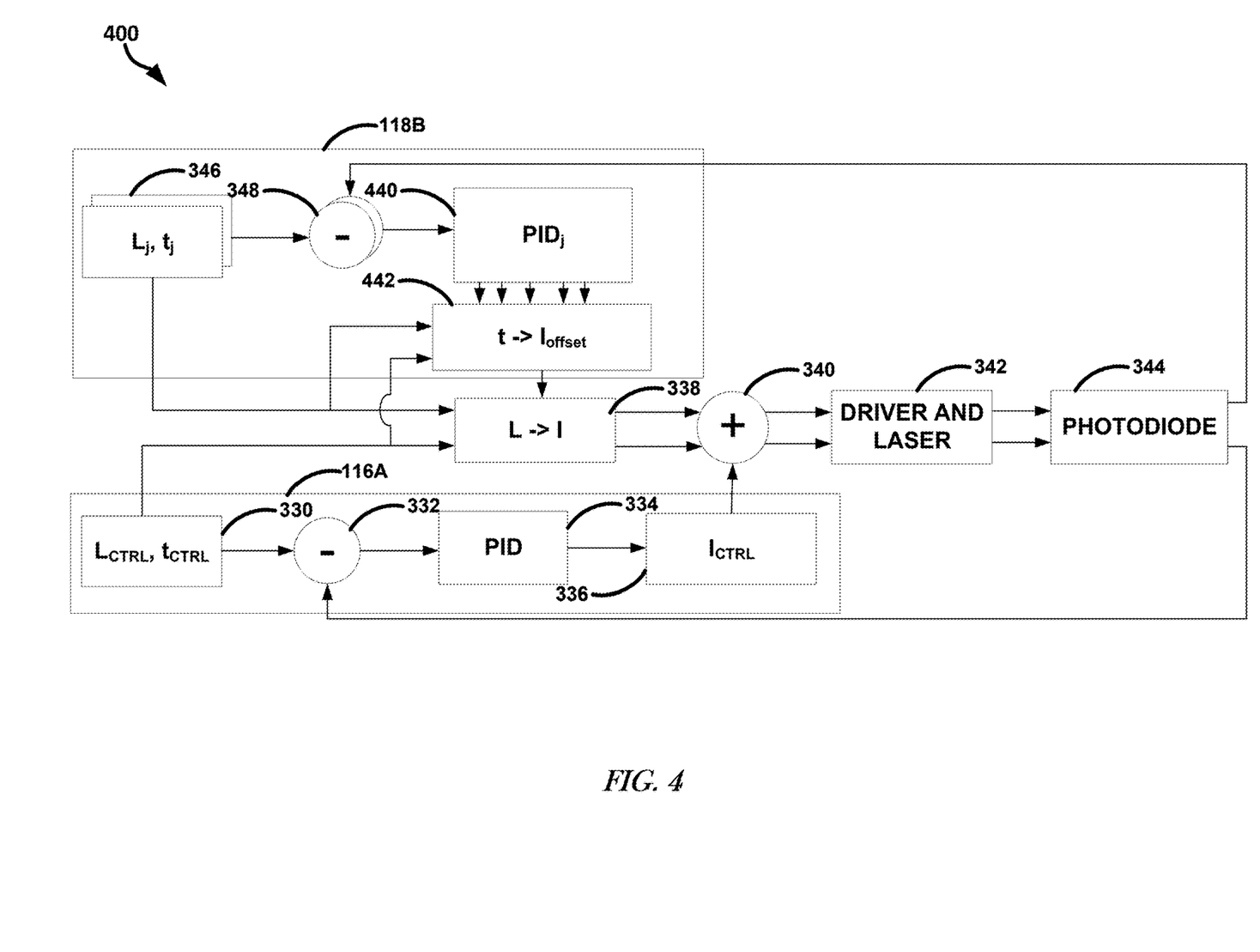
FIG. 4 illustrates, by way of example, a diagram of another embodiment of an improved laser control system for populating a display.
Figure 5:
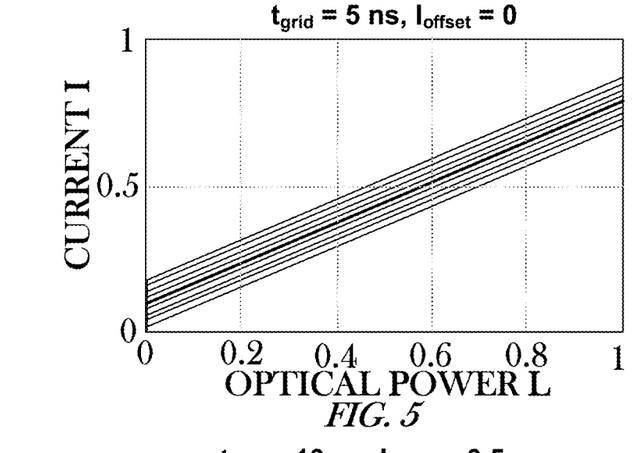
FIGS. 5, 6, 7, and 8 illustrate, by way of example, graphs of current versus optical power for different time spacings and current offsets.
Figure 6:
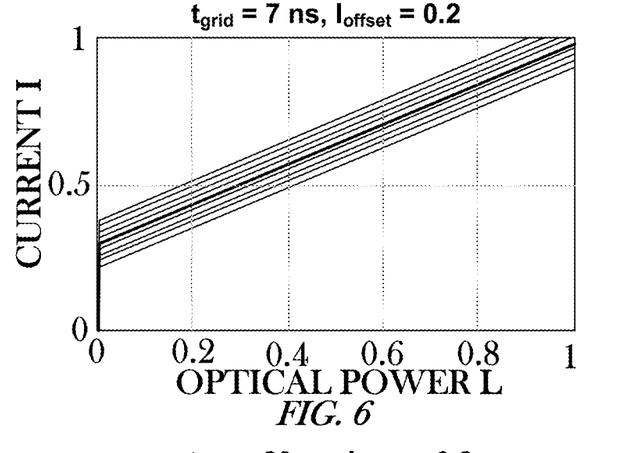
Figure 7:
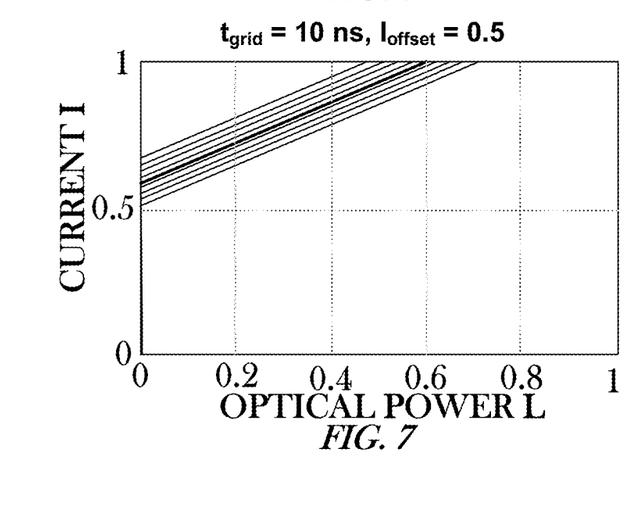
Figure 8:
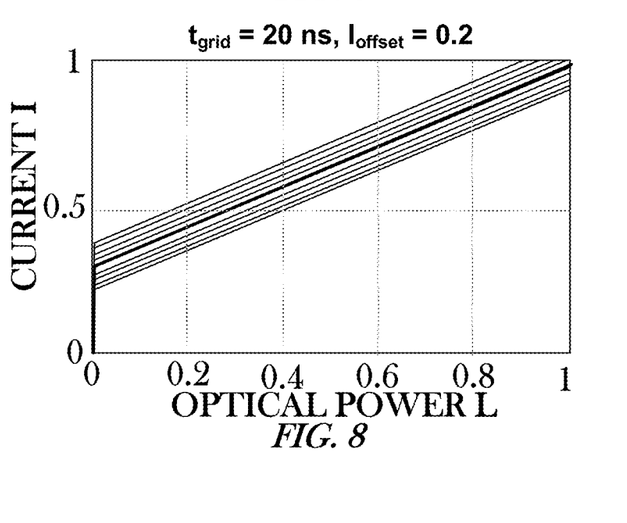

FIG. 4 illustrates, by way of example, a diagram of another embodiment of an improved laser control system 400 for populating a display. The system 400 is similar to the system 300, with the system 400 including a different secondary measurement system 118B. The secondary measurement system 118B includes the same control pair 346 and difference operators 348 as the secondary measurement system 118A. The secondary measurement system 118B includes a plurality of PID controllers 440 that provide errors to a pulse period to current offset operator 442. The current offset operator 442 determines how to adjust the intensity-to-current curves based on the intensity at a constant current and different pulse periods.

In the example of FIG. 4, the secondary measurement system 118B iterates over a list of requested, different pulse periods at a constant light intensity level. The light-to-current model 338 has a look-up table for modifying the estimated threshold as a function of pulse timing. Differences between the calibrated behavior and actual behavior result in in errors at some pulse timings. Modifications to the lookup table that represents the light-to-current model 338 are parameterized by a smooth-multi segment curve in which each measurement is associated with a section of the curve. By updating the parameters of each of these segments, the controller 118B can minimize the error at each of the pulse width measurements. This controller could be an array of PID controllers, a steepest descent controller with cost function depending on all errors, or any number of more advanced controllers. The optimization performed by the controller 118B can be run as part of a post-calibration correction, or repeatedly over the life of the device.

In FIG. 4, the light-to-current model consists of three parts, a calibrated light-to-current lookup table (the light-to-current model 338), current offset $I_{CTRL}$ 336 for adjusting the model threshold, and a timing-to-current offset lookup table that further applies a current offset depending on the pulse timing. The primary control loop 116A, makes measurements at constant light level $L_{CTRL}$, and constant pulse timing $t_{CTRL}$. These measurements are used to update the control offset via the PID controller 334.

In the secondary control loop 118B, multiple drive conditions (e.g., multiple pulse timings) are iteratively measured, all with the same light level, but with different pulse timing. The flow for one of these light intensities $L_j$, and pulse timings $t_j$ is shown. The error is calculated for each measurement condition and fed into its own PID controller 440 which is dedicated to a given light intensity. Each pulse timing $t_j$ controls one or more entries in the offset operator 442 which can be implemented as a lookup table. Thus, the array of PID controllers 440 minimize the model error at a range of pulse timings.

An example is now discussed with reference to some graphs. In this example, the L-to-I curve is a high resolution lookup table giving a single current for each input light level, populated via device calibration. The t-to-$I_{offset}$ lookup table consists of 4 current offsets, at 4 different pulse spacing values (see FIG. 9). For pulse spacing values in between these grid points, linear interpolation between grid points is used to calculate the lookup offset current. First, though, consider the summed output of the L-to-I table, the t-to-$I_{offset}$ table, and the $I_{CTRL}$ for the simple control loop only, i.e. with fixed values in the t-to-$I_{offset}$ table.

FIGS. 5, 6, 7, and 8 illustrate, by way of example, graphs of current versus optical power for different time spacings and current offsets. FIGS. 5-8 consider the summed output of the L-to-I table, the t-to-$I_{offset}$ table, and the $I_{CTRL}$ for the simple control loop only, i.e. with fixed values in the t-to-$I_{offset}$ table.

Looking at the output for the 4 pulse spacing cases corresponding to the grid points of the t-to-$I_{offset}$ table, we see a number of features. Generally, each L-to-I curve starts with a large amount of current even for small values of requested light power, which models the threshold behavior of the laser. The different spacing grid points have different modeled threshold currents, capturing the threshold change with pulse timing physics of the laser. Finally, the $I_{CTRL}$ parameter applies a global offset current to all spacing values to capture changes in threshold with temperature.

Figure 9:
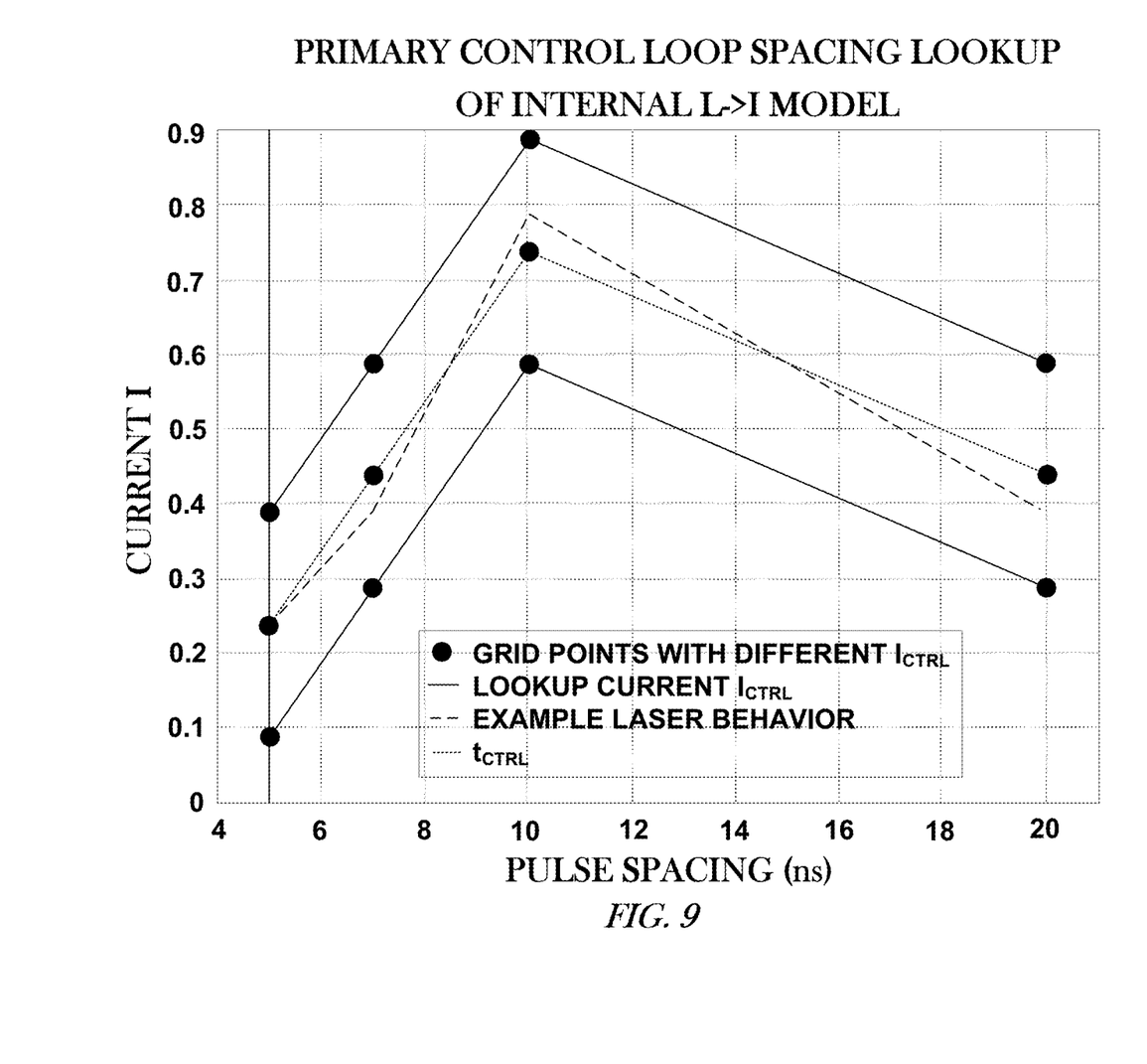
FIG. 9 illustrates, by way example, in graph form, a specific lookup current calculated for light level=0.2 (normalized units) for the case of the simple control loop only.

FIG. 9 illustrates, by way example, in graph form, a specific lookup current calculated for light level=0.2 (normalized units) for the case of the simple control loop only. The control loop can servo $I_{CTRL}$, which translates the lookup current up and down regardless of the pulse spacing. Three such examples of $I_{CTRL}$ are shown in FIG. 9. The primary control loop, in ideal conditions, can servo $I_{CTRL}$ to match the real device behavior at $t_{CTRL}$, which is shown by the middle line. Despite this match at $t_{CTRL}$, it clearly does not match device behavior, due to non-ideal conditions, at other values of pulse spacing, leading to display errors.

Figure 10:
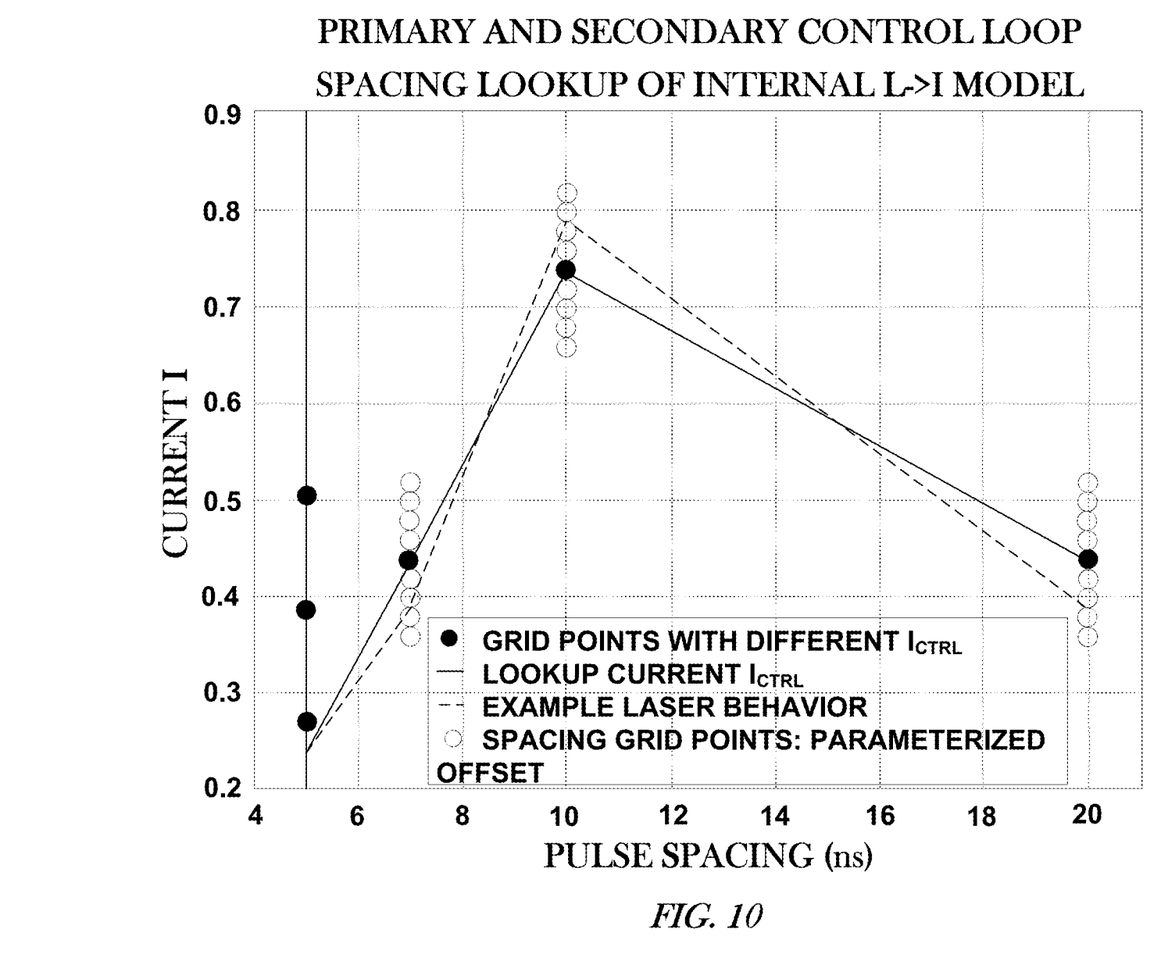
FIG. 10 illustrates, by way of example, in the form of a graph, an L→I lookup table in a system with a primary control loop and a secondary control loop.

FIG. 10 illustrates, by way of example, in the form of a graph, an L→I lookup table in a system with a primary control loop and a secondary control loop. Consider a control system that includes both the primary control loop and the secondary control loop where the primary control loop has already optimized $I_{CTRL}$ at $t_{CTRL}$. Measurements are made at spacings corresponding to the spacing grid points (e.g., $t_j$=7, 10, 20 ns in the example of FIG. 10), interleaved with the primary control measurements at $t_{CTRL}$=5 ns. The PID associated with each measurement can update an offset parameter (illustrated as open circles) in each of these grid points. A range of updated grid point offsets are shown in the figure above as open circles. An offset can be chosen to match the real behavior of the system at each of the three grid points, and thus each of these PID controllers would minimize their errors by doing so. The primary and secondary loop would thus provide a better prediction of the actual behavior than the primary loop alone, minimizing errors and resulting in better image quality.

In another example, the model-based controller stores estimated light-to-current curves for different temperatures and interpolates between them to produce and estimate of the behavior at the known temperature. Closed loop feedback, and direct temperature measurement may be involved in the estimate of temperature. This would be similar to example 1, where segments of the light-to-current curve are updated by each measurement, but in this case only the relevant parts of the model corresponding to the temperature at which measurements were made.

Figure 11:
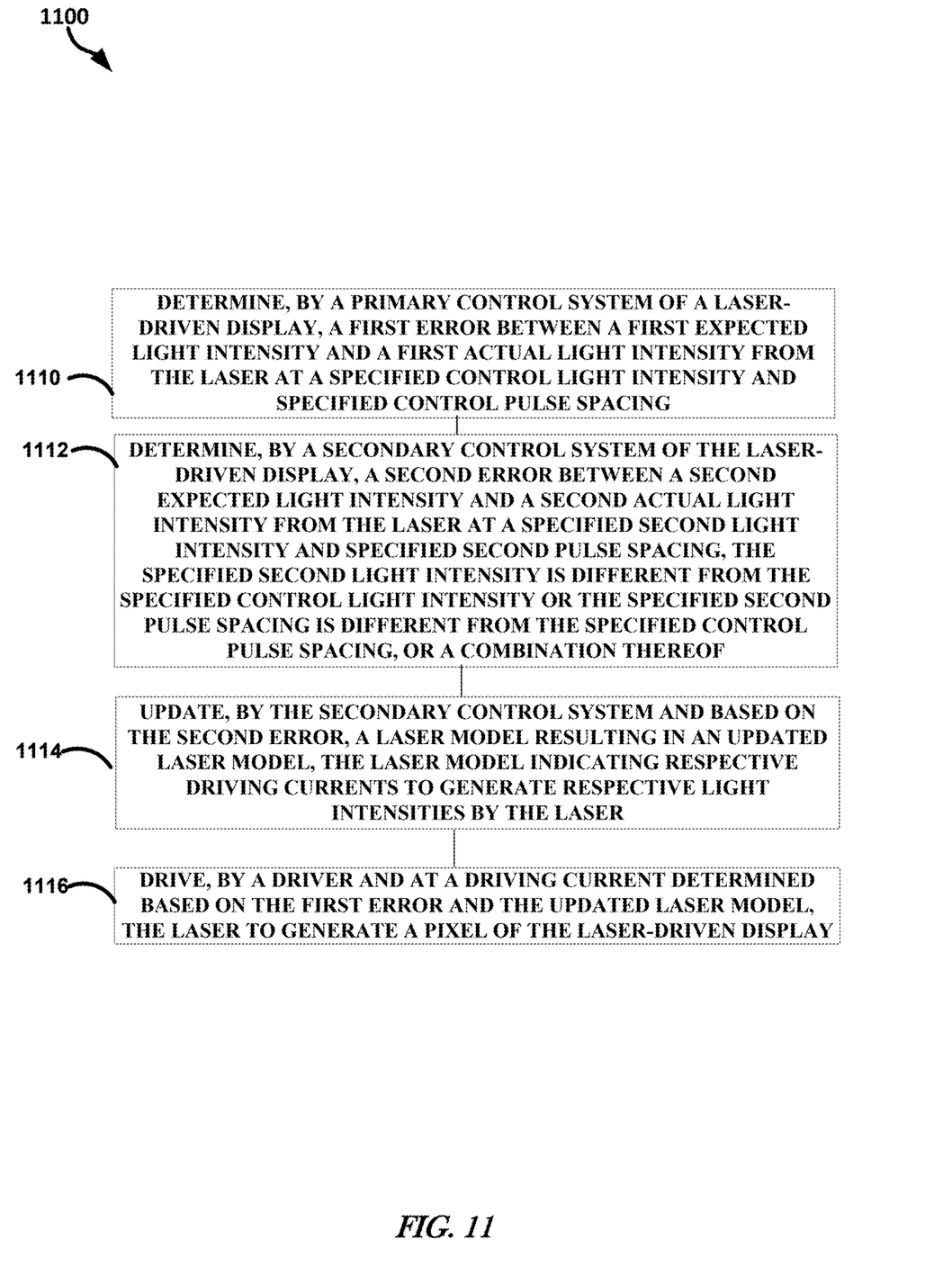
FIG. 11 illustrates, by way of example, a diagram of an embodiment of a method for driving a laser of a laser-driven display.

FIG. 11 illustrates, by way of example, a diagram of an embodiment of a method 700 for laser-driven display control. The method 1100 as illustrated includes determining, by a primary control system of a laser-driven display, a first error between a first expected light intensity and a first actual light intensity from the laser at a specified control light intensity and specified control pulse spacing, at operation 1110; determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof, at operation 1112; updating, by the secondary control system and based on the second error, a laser model resulting in an updated laser model, the laser model indicating respective driving currents to generate respective light intensities by the laser, at operation 1114; and driving, by a driver and at a driving current determined based on the first error and the updated laser model, the laser to generate a pixel of the laser-driven display, at operation 1116.

The primary control system can be constrained to determine the first error at a single driving condition including the specified control light intensity and the specified control pulse spacing. Operation of the secondary control system can be time multiplexed with the operation of the primary control system. The primary control system can include a proportional, integral, derivative (PID) controller that determines the first error. The secondary control system can include a steepest descent controller that determines the second error. The second error can include parameterized modifications to a plurality of driving conditions at a specified driving current.

The method 1100 can further include adding, by an addition operator, the first error to a driving current corresponding to a light intensity in the updated laser model, the light intensity corresponding to a pixel of an image provided on the laser-driven display. The secondary control system can include a plurality of PID controllers dedicated to determining errors at respective driving conditions. The driving conditions can include different laser pulse spacings. The actual light intensity can be determined by a photodiode that receives a portion of light generated by the laser.

Figure 12:
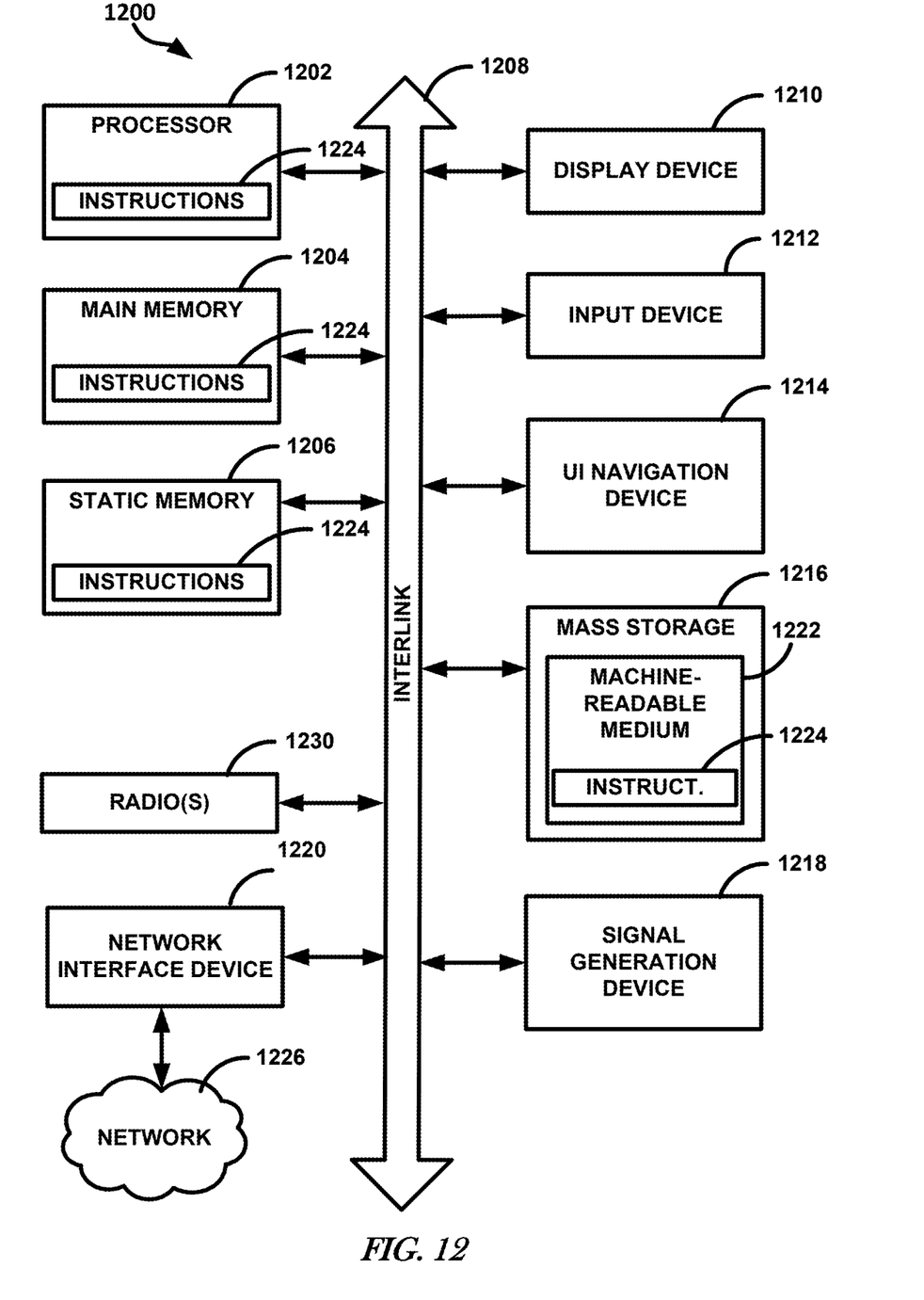
FIG. 12 illustrates, by way of example, a block diagram of an embodiment of a machine in the example form of a computer system within which instructions, for causing the machine to perform any one or more of the methods or techniques discussed herein, may be executed.

FIG. 12 illustrates, by way of example, a block diagram of an embodiment of a machine in the example form of a computer system 1200 within which instructions, for causing the machine to perform any one or more of the methods or techniques discussed herein, may be executed. One or more of the primary control system 116, 116A, secondary control system 118, 118A, 118B, laser model 108, light-to-current curve 338, adder operation 340, driver, method 1100, a component thereof, or other component, operation, or technique, can include, or be implemented or performed by one or more of the components of the computer system 1200. In a networked deployment, the machine may operate in the capacity of a server or a client machine in server-client network environment, or as a peer machine in a peer-to-peer (or distributed) network environment. The machine may be a personal computer (PC), server, a tablet PC, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a mass storage unit 1216, a signal generation device 1218 (e.g., a speaker), a network interface device 1220, and a radio 1230 such as Bluetooth, WWAN, WLAN, and NFC, permitting the application of security controls on such protocols.

The mass storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding, or carrying instructions for execution by the machine, and includes digital or analog communications signals or other intangible media to facilitate communication of such software.

ADDITIONAL EXAMPLES

Example 1 includes a method for control of a laser in a laser-driven display, the method comprising determining, by a primary control system of a laser-driven display, a first error between a first expected light intensity and a first actual light intensity from the laser at a specified control light intensity and specified control pulse spacing, determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof, updating, by the secondary control system and based on the second error, a laser model resulting in an updated laser model, the laser model indicating respective driving currents to generate respective light intensities by the laser, and driving, by a driver and at a driving current determined based on the first error and the updated laser model, the laser to generate a pixel of the laser-driven display.

In Example 2, Example 1 further includes, wherein the primary control system is constrained to determining the first error at a single driving condition including the specified control light intensity and the specified control pulse spacing.

In Example 3, at least one of Examples 1-2 further include, wherein operation of the secondary control system is time multiplexed with the operation of the primary control system.

In Example 4, at least one of Examples 1-3 further includes, wherein the primary control system includes a proportional, integral, derivative (PID) controller that determines the first error.

In Example 5, Example 4 further includes, wherein the secondary control system includes a steepest descent controller that determines the second error.

In Example 6, Example 5 further include, wherein the second error includes parameterized modifications to a plurality of driving conditions at a specified driving current.

In Example 7, at least one of Examples 5-6 further includes adding, by an addition operator, the first error to a driving current corresponding to a light intensity in the updated laser model, the light intensity corresponding to a pixel of an image provided on the laser-driven display.

In Example 8, at least one of Examples 4-7 further includes, wherein the secondary control system includes a plurality of PID controllers dedicated to determining errors at respective driving conditions.

In Example 9, Example 8 further includes, wherein the driving conditions are different laser pulse spacings.

In Example 10, at least one of Examples 1-9 further includes, wherein the actual light intensity is determined by a photodiode that receives a portion of light generated by the laser.

Example 11 includes a laser-driven display control system comprising a laser, a primary control system configured to provide a light intensity value as an index into a laser model to determine a driving current, and determine a first error between a first expected light intensity and a first actual light intensity from the laser at a specified control light intensity and specified control pulse spacing, a secondary control system configured to determine a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof, and update, based on the second error, the laser model resulting in an updated laser model; and a driver configured to provide a driving current determined based on the first error, the light intensity value and the updated laser model, to the laser.

In Example 12, Example 11 further includes, wherein the primary control system includes a proportional, integral, derivative (PID) controller that determines the first error.

In Example 13, Example 12 further includes, wherein the secondary control system includes a steepest descent controller that determines the second error.

In Example 14, Example 13 further includes, wherein second error includes parameterized modifications to a plurality of driving conditions at a specified driving current.

In Example 15, Example 14 further includes an addition operator configured to add the first error to a driving current corresponding to a light intensity in the updated laser model resulting in a sum, the light intensity corresponding to a pixel of an image provided on the laser-driven display, and provide the sum to the driver.

In Example 16, at least one of Examples 12-15 further includes, wherein the secondary control system includes a plurality of PID controllers dedicated to determining errors at respective different laser pulse spacings.

In Example 17, at least one of Examples 11-16 further includes a photodiode situated to receive a portion of the light from the laser and provide data indicating an intensity of the received light to the primary and secondary control systems.

Example 18 includes a machine-readable medium including instructions that, when executed by a machine, cause the machine to perform operations for control of a laser of a laser-driven display, the operations comprising determining, by a primary control system of a laser-driven display, a first error between a first expected light intensity and a first actual light intensity from the laser at a specified control light intensity and specified control pulse spacing, determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof, updating, by the secondary control system and based on the second error, a laser model resulting in an updated laser model, the laser model indicating respective driving currents to generate respective light intensities by the laser, determining, based on the first error and the updated laser model, a driving current, and providing, to a driver of the laser, the driving current.

In Example 19, Example 18 further includes, wherein the primary control system is constrained to determining the first error at a single driving condition including the specified control light intensity and the specified control pulse spacing, and the secondary control system determines the second error for a plurality of driving conditions.

In Example 20, at least one of Examples 18-19 further includes, wherein operation of the secondary control system is time multiplexed with the operation of the primary control system.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A method for control of a laser in a laser-driven display, the method comprising:
   determining, by a primary control system of a laser-driven display, a first error between a first expected light intensity and a first actual light intensity from the laser at a specified control light intensity and specified control pulse spacing;

determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof;

updating, by the secondary control system and based on the second error, a laser model resulting in an updated laser model, the laser model indicating respective driving currents to generate respective light intensities by the laser; and driving, by a driver and at a driving current determined based on the first error and the updated laser model, the laser to generate a pixel of the laser-driven display.

2. The method of claim 1, wherein the primary control system is constrained to determining the first error at a single driving condition including the specified control light intensity and the specified control pulse spacing.

3. The method of claim 1, wherein operation of the secondary control system is time multiplexed with the operation of the primary control system.

4. The method of claim 1, wherein the primary control system includes a proportional, integral, derivative (PID) controller that determines the first error.

5. The method of claim 4, wherein the secondary control system includes a steepest descent controller that determines the second error.

6. The method of claim 5, wherein the second error includes parameterized modifications to a plurality of driving conditions at a specified driving current.

7. The method of claim 5, further comprising adding, by an addition operator, the first error to a driving current corresponding to a light intensity in the updated laser model, the light intensity corresponding to a pixel of an image provided on the laser-driven display.

8. The method of claim 4, wherein the secondary control system includes a plurality of PID controllers dedicated to determining errors at respective driving conditions.

9. The method of claim 8, wherein the driving conditions are different laser pulse spacings.

10. The method of claim 1, wherein the actual light intensity is determined by a photodiode that receives a portion of light generated by the laser.

11. A laser-driven display control system comprising:
a laser;
a primary control system configured to:
provide a light intensity value as an index into a laser model to determine a driving current; and
determine a first error between a first expected light intensity and a first actual light intensity from the laser at a specified control light intensity and specified control pulse spacing;
a secondary control system configured to:
determine a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof; and update, based on the second error, the laser model resulting in an updated laser model; and
a driver configured to provide a driving current determined based on the first error, the light intensity value and the updated laser model, to the laser.

12. The system of claim 11, wherein the primary control system includes a proportional, integral, derivative (PID) controller that determines the first error.

13. The system of claim 12, wherein the secondary control system includes a steepest descent controller that determines the second error.

14. The system of claim 13, wherein second error includes parameterized modifications to a plurality of driving conditions at a specified driving current.

15. The system of claim 14, further comprising an addition operator configured to:
add the first error to a driving current corresponding to a light intensity in the updated laser model resulting in a sum, the light intensity corresponding to a pixel of an image provided on the laser-driven display; and
provide the sum to the driver.

16. The system of claim 12, wherein the secondary control system includes a plurality of PID controllers dedicated to determining errors at respective different laser pulse spacings.

17. The system of claim 11, further comprising a photodiode situated to receive a portion of the light from the laser and provide data indicating an intensity of the received light to the primary and secondary control systems.

18. A non-transitory machine-readable medium including instructions that, when executed by a machine, cause the machine to perform operations for control of a laser of a laser-driven display, the operations comprising:
determining, by a primary control system of a laser-driven display, a first error between a first expected light intensity and a first actual light intensity from the laser at a specified control light intensity and specified control pulse spacing;

determining, by a secondary control system of the laser-driven display, a second error between a second expected light intensity and a second actual light intensity from the laser at a specified second light intensity and specified second pulse spacing, the specified second light intensity is different from the specified control light intensity or the specified second pulse spacing is different from the specified control pulse spacing, or a combination thereof;

updating, by the secondary control system and based on the second error, a laser model resulting in an updated laser model, the laser model indicating respective driving currents to generate respective light intensities by the laser;

determining, based on the first error and the updated laser model, a driving current; and providing, to a driver of the laser, the driving current.

19. The non-transitory machine-readable medium of claim 18, wherein:
the primary control system is constrained to determining the first error at a single driving condition including the specified control light intensity and the specified control pulse spacing, and
the secondary control system determines the second error for a plurality of driving conditions.

20. The non-transitory machine-readable medium of claim 18, wherein operation of the secondary control system is time multiplexed with the operation of the primary control system.

* * * * *